Figure 1:
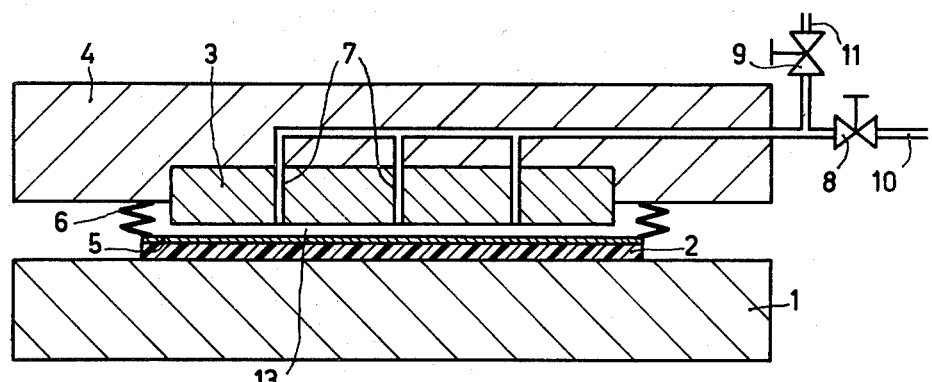

United States Patent [19]

Mijnheer

[11] 4,233,261
[45] Nov. 11, 1980

[54] METHOD AND DEVICE FOR MANUFACTURING INFORMATION CARRIERS

[75] Inventor: Andries Mijnheer, Eindhoven

[73] Assignee: U.S. Philips Corporation, New York, N.Y.

[21] Appl. No.: 880,505

[22] Filed: Feb. 23, 1978

[30] Foreign Application Priority Data

Sep. 28, 1977 [NL] Netherlands .......................... 7710555

[51] Int. Cl.² ............................................. B29C 17/00
[52] U.S. Cl. .................... 264/293; 264/571; 425/385; 425/389
[58] Field of Search ............... 264/293, 284, 314, 316, 264/85, 571; 425/384, 386, 387.1, 388, 389, 385

[56] References Cited

U.S. PATENT DOCUMENTS

| 2,536,316 | 1/1951 | Schwarz et al. | 264/293 |
| 2,970,345 | 2/1961 | Wangner, Jr. | 264/139 |
| 3,157,723 | 11/1964 | Hockberg | 264/293 |
| 3,535,740 | 10/1970 | Frowde | 425/385 |

FOREIGN PATENT DOCUMENTS

| 1112645 | 8/1961 | Fed. Rep. of Germany . | |
| 2143135 | 8/1971 | Fed. Rep. of Germany | 425/385 |
| 5160255 | 5/1976 | Japan | 264/293 |
| 907624 | 10/1962 | United Kingdom | 425/385 |

Primary Examiner—James B. Lowe
Attorney, Agent, or Firm—Thomas A. Briody; William J. Streeter; Simon L. Cohen

[57] ABSTRACT

Method of and a device for manufacturing information carriers form a thermoplastic material, where a thin information carrying die is heated by bringing it into contact with a relatively thick, heated surface and is subsequently separated from the heated surface and pneumatically pressed against the thermoplastic material by a layer of air that thermally isolates the die from the heated surface so that the die may rapidly cool.

4 Claims, 3 Drawing Figures

METHOD AND DEVICE FOR MANUFACTURING INFORMATION CARRIERS

The invention relates to a method of manufacturing information carriers from a thermoplastic material, a thin information carrying die being heated and subsequently pressed against the thermoplastic material.

A method of this type is known from German Pat. Specification No. 1,112,645. In accordance with this known method the die is heated outside the pressing device, subsequently transferred to the pressing device and then the die is pressed against the thermoplastic substrate with a cooled plate. It is the purpose of this method to ensure that the heat content of the die just suffices to render the substrate superficially plastic, so that it can be provided with the information, after which rapid cooling is possible. Thus, it is attempted to obtain a short cycling time. A disadvantage of this known method is that it is comparatively complex and that the heat content, heat loss during transfer and heat flow to the cooling plates cannot readily be controlled.

A slightly less complex method is described in DT-OS 1504 037, but also in this case it is difficult to keep conditions under control.

It is an object of the invention to provide a method of manufacturing information carriers which can be realized in a simple manner and which provides a very short cycling time.

The method in accordance with the invention is characterized in that the die is first brought into contact with a heated surface and is subsequently pressed against the thermoplastic material by means of air pressure.

In accordance with the inventive method the die is first brought to a specific temperature through contact with a surface having said temperature.

The heat content is then known exactly. Subsequently, the die is pressed against the substrate. The heat stored in the die can now readily be controlled so that only the surface of the substrate initially reaches a temperature which is above a critical value, after which the heat is rapidly dispersed in the substrate and the assembly is cold enough to be removed from the press.

The invention furthermore relates to a device for carrying out the said method, which device comprises a lower block on which a substrate can be supported. In accordance with the invention an upper block, which can be heated, is stationarily arranged above said lower block and there is disposed a die between the lower block and the upper block, which die is movable between the two blocks, while furthermore there are provided means for alternately pressing the die against the upper block and against the substrate on the lower block.

In accordance with a further embodiment the upper block is provided with a plurality of openings which are alternately connectable to an air extraction and air supply line. The die may be free-floating between the two blocks or, in accordance with a further embodiment, the die may be connected to the upper block in a sealed manner, for example with the aid of bellows or sealing rings.

The invention will be described in more detail with reference to the drawing.

FIG. 1 is a schematic cross-sectional view of a device for pressing information carriers.

Figure 2:
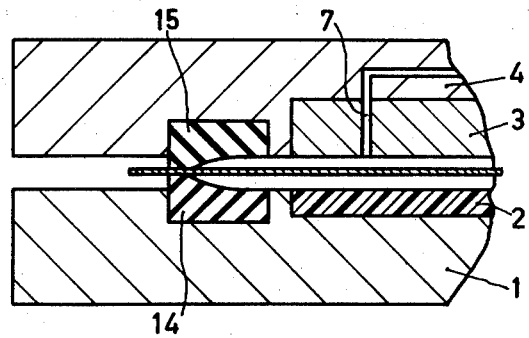
Figure 3:
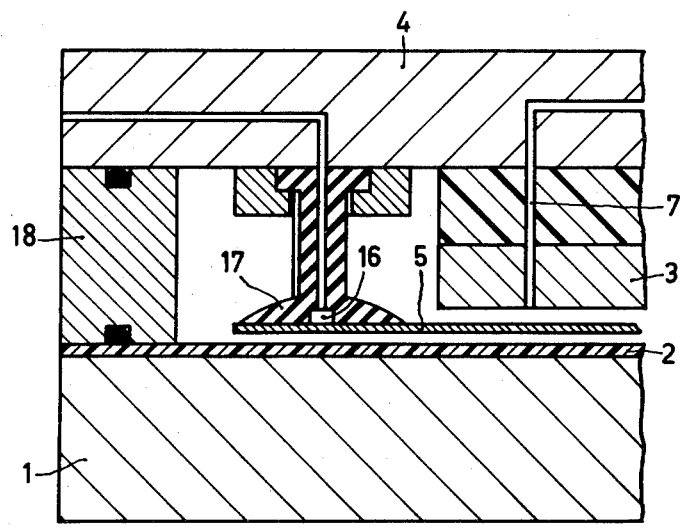

FIGS. 2 and 3 schematically show two other embodiments of the device of FIG. 1.

In FIG. 1 the reference numeral 1 refers to a lower block on which a substrate 2 of a thermoplastic material is placed. Above the lower block an upper block, which can be heated in a manner not shown, is affixed to a further section 4 of the device. A die 5 is connected to the section 4 via bellows 6 so as to ensure sealing.

In the punch block 3 a plurality of openings 7 are formed which are alternately connectableto a vacuum suction line 10 and a pressure line 11 via valves 8 and 9.

The operation is as follows: The thin die 5 is drawn against the heated block 3 by the vacuum created in the chamber 13 upon opening of the valve 8 and is thus brought to the same temperature as that of the block. Subsequently, the valve 8 is closed and the valve 9 is opened, so that the die is urged against the cold substrate 2 underneath it by air pressure. During this operation the hot die 5 is thus insulated from the hot upper block 3 by means of an air layer. Owing to the low heat penetration coefficient of the substrate the surface temperature of the substrate is instantaneously substantially equal to the initial temperature of the die. The information grooves of the die can then readily be reproduced by the substrate. The surface temperature and the die temperature then decrease rapidly because the heat is dispersed in the substrate. The surface layer then solidifies again and the finished information carrier can be removed from the device. In this device only the die moves up and down. The required stroke may then be small, for example of the order of 1 mm. A total cycling time of a few seconds is attainable. FIG. 2 shows how instead of suspending of the die 5 with the aid of bellows it is alternatively possible to mount the die 5 between two elastic sealing rings 14, 15. It is even possible to mount the die freely between the two blocks, so that the die then moves as a floating valve and is then one time drawn against the upper block by the vacuum and another time pressed against the substrate by the air pressure.

FIG. 3 shows an embodiment in which the die 5 is drawn against a flexible ring 17 via a vacuum which is sustained in an annular chamber 16, which ring is connected to the further constructional member 4. Furthermore, a sealing ring 18 is interposed between the lower block 1 and the constructional member 4. The last-mentioned ring enables a vacuum to be formed between the die and substrate before the die is pressed down onto the substrate 2 by means of air pressure, so that air entrapment is prevented. In this embodiment the member 4 should be capable of performing a small travel in the vertical direction, so as to enable the substrate to be fed into and out of the device.

What is claimed is:

1. A method of manufacturing information carriers from a thermoplastic material, comprising first bringing a relatively thin die into contact with a relatively thick surface heated to a temperature slightly above the melting temperature of a solid thermoplastic substrate while maintaining said die spaced from said substrate, then maintaining the contact between the heated surface and the die and the spatial separation between the die and the substrate for a time sufficient to permit the die to acquire the temperature of the heated surface, then separating the die from the heated surface with an insulating layer of gas, and finally pressing the die against the thermoplastic substrate immediately thereafter by means of pneumatic pressure derived from said gas.

2. A device for manufacturing record carriers from a solid thermoplastic material, comprising a relatively thin information carrying die, a relatively thick block positioned in opposed relationship to said die and heated to a temperature slightly higher than the melting temperature of the thermoplastic material, means to position and support said thermoplastic material on a side of the die opposite and spaced from said block, and pressing means for alternately moving the die into a position spaced from said thermoplastic material and abutting the block and for thereafter moving the die to an alternate position spaced from the block and in contacting relationship with said thermoplastic material and for providing an insulting gas layer between the die and the block when the die is in the alternate position.

3. A device as recited in claim 2, wherein the pressing means comprises means for flexibly connecting the die to the block to form a sealed chamber therebetween, and means connected to the sealed chamber for alternately withdrawing sufficient gas from the chamber to move the die into abutting relationship with the heated block and flowing gas into the chamber to move the block away from the die and into abutting relationship with the thermoplastic material.

4. A device as recited in claim 3 wherein the means connected to the sealed chamber for alternately withdrawing and providing gas to the chamber comprises an air extraction and supply line connected to the chamber through a plurality of openings formed in the heated block.

* * * * *